United States Patent

[11] 3,581,102

| [72] | Inventor | Kazuyoshi Nagao |
| | | Kanagawa-ken, Japan |
| [21] | Appl. No. | 787,058 |
| [22] | Filed | Dec. 26, 1968 |
| [45] | Patented | May 25, 1971 |
| [73] | Assignee | Canon Camera Co., Ltd. |
| | | Tokyo, Japan |
| [32] | Priority | Jan. 8, 1968, Jan. 8, 1968 |
| [33] | | Japan |
| [31] | | 43/23811 and 43/985 |

[54] PHOTOELECTRIC AND ELECTRIC LIGHT CONVERSION ELEMENT
10 Claims, 9 Drawing Figs.

[52] U.S. Cl. .................................................. 250/227, 250/219
[51] Int. Cl. .................................................... G02b 5/16
[50] Field of Search ........................................ 250/227, 219 (CR), 219 (I), 219 (ID), 219 (IDC), 219 (F); 350/96 (B); 178/7.8, 7.86, 6 (LCR)

[56] References Cited
UNITED STATES PATENTS

| 3,043,179 | 7/1962 | Dunn | 250/227(X) |
| 3,211,540 | 10/1965 | Cole | 350/96(X) |
| 3,267,555 | 8/1966 | Berger et al. | 350/96(X) |
| 3,345,531 | 10/1967 | Sheldon | 250/227(X) |
| 3,470,319 | 9/1969 | McGlamery | 350/96(X) |
| 3,485,609 | 12/1969 | Peck | 350/96(X) |

OTHER REFERENCES

Sokolski: IBM Technical Disclosure Bulletin; Vol. 8; No. 11; April, 1966; page 1580 250/227

Primary Examiner—Walter Stolwein
Attorney—McGlew and Toren

ABSTRACT: In photoelectric transducing apparatus of the type having an electron beam scanning a surface coated with electron activated light emitting material to convert graphic information into electrical output signals, or modulated in accordance with electrical input signals to convert the input signals into graphic information, a light transmitting means comprises a plurality of optical fibers fused together in juxtaposed relation to form a plate having a solid, voidless cross section of the optical fibers. The light transmitting means may comprise a plate severed from the fused fibers and fritted to the surface of a cathode-ray tube, in combination with a light transmitting channel formed of the fused optical fibers. The end faces of the channel may be formed either by cutting perpendicular to the lengths of the fibers or by cutting at an angle to such perpendicular.

PATENTED MAY 25 1971 3,581,102

INVENTOR.
KAZUYOSHI NAGAO
BY Menyfour and Toren
Attorneys

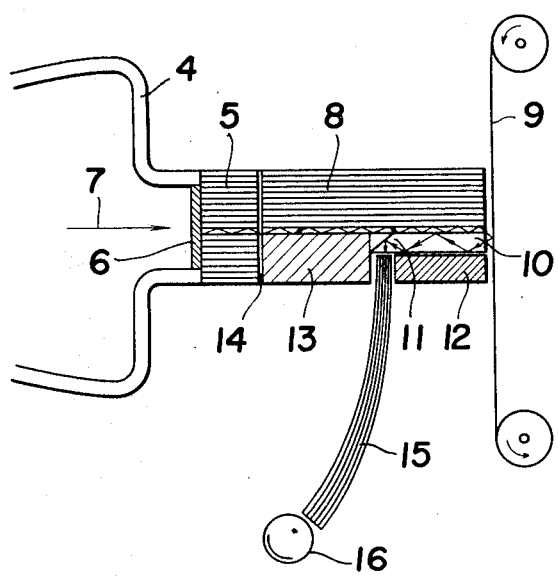
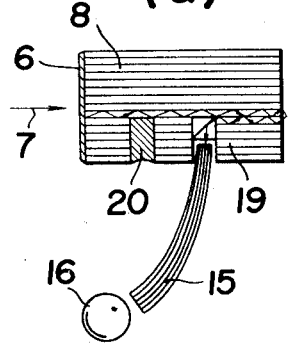
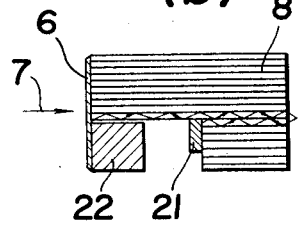
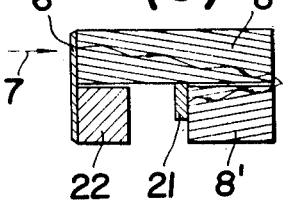
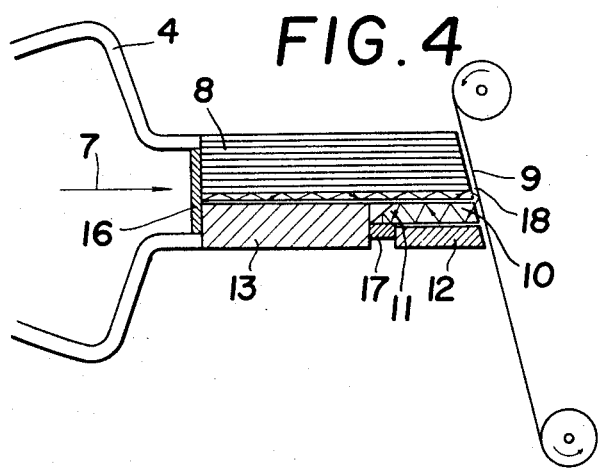

PHOTOELECTRIC AND ELECTRIC LIGHT CONVERSION ELEMENT

This invention relates to input and output apparatus for facsimile, letter transmission and mark sensing.

The invention apparatus has advantages such as the combination of the input and output apparatus into a single apparatus, which is particularly advantageous in the fields mentioned above. A further advantage is an increase in the scanning speed, the ability to effect plane scanning, the simplification of the apparatus, and the improvement in the resolution power, as well as other advantages.

The method used in the conventional input and output apparatus for letter transmission or facsimile is that a manuscript or the photosensitive material on which a recording is to be made according to input signals is wound around a cylinder.

Therefore, its operation was intermittent and it was impossible to see what manuscript was being transmitted, or what signals were being transmitted, as long as the apparatus was in operation. Furthermore, the transmitting apparatus and the receiving apparatus were usually separately composed.

As to transmitting and receiving apparatus of plane scanning type, various suggestions have been made such as circle to line converters in which fibers are arranged, or helical slit arrangement, etc. However, many of these had limited speed as they employ mechanical scanning, and the use of one apparatus for both transmission and receiving has not necessarily been successful. Some of the systems suggested have not been suitable for photographs with halftone.

An example of application in other fields is the input and output in an electronic computer. That is, punch card input and punch tape input is now gradually being replaced by the system of reading out the marked card for input, because of easiness of marking. Also the line printers, etc. used for recording have many problems as to speed, cost, etc. because they are mechanical system.

SUMMARY OF THE INVENTION

The element used in the present invention is of the electron tube type. Therefore it has high scanning speed scanning, plane, makes possible, is, easy to handle, and involves a lower cost.

It also has such advantages that it can be converted into a single apparatus in which both the transmitting function and the receiving function are combined without requiring so many modifying accessories or auxiliary equipment.

The present invention relates to a photoelectric transducer for converting the light, which is reflected from an opaque manuscript being scanned with bright spots by electron beam scanning, into electric signals. In particular the invention relates to the structure of parts transmitting the incident and received scanning light. The photoelectric transducer in the present invention can be used not only as a readout element but also as a printout element, by exposing photosensitive material to the scanning light which is produced by the impingement of an electron beam modulated by video signals.

While the method of photoelectric conversion with electron beam scanning has characteristics such that its scanning speed can be remarkably increased compared to the conventional mechanical means of scanning, in apparatus with a conventionally known flying spot scanner of known arrangements, there have been various restrictions in practical application in respect to optical structure, insufficient of light, etc.

The present invention relates to an improvement of a photoelectric transducer of the type which employs, as the source of light, so-called optical fiber tubes using an optical fiber plate as the faceplate for a cathode-ray tube.

A faceplate of optical fiber tubes has been made by sandwiching a layer or plural layers of optical fibers 1 between two glass blocks 2, as shown in FIG. 1, cutting this sandwich structure into suitable thicknesses and fritting the same around the envelope of a cathode-ray tube. In a photoelectric transducer thus formed this created gaps 3 between each fibrous element, and such gap portion constitutes a dead spaces which do not serve for transmission of information. Thus it is not suitable for reading out manuscripts as having halftones.

In the present invention a fused optical fiber plate is formed by fusing together juxtaposed optical fibers, in order to eliminate the above-mentioned shortcomings in photoelectric transducer which employ optical fiber tubes as a source of light, and to enable the transducer to read out the manuscripts with halftones.

BRIEF DESCRIPTION OF THE DRAWINGS

In the drawings:

FIG. 1b is an enlarged sectional view corresponding to FIG. 1a;

FIG. 3 is a sectional view of a photoelectric transducer embodying the invention;

FIG. 4 is a sectional view of another form of photo transducer embodying the invention; and FIG. 5a, 5b and 5c are sectional views of further forms of light transmission channels embodying the invention.

FIGS. 2a and 2b illustrate a fused optical fiber plate as used in a photoelectric transducer in accordance with the invention. This fused optical fiber plate is formed by fusing together the surfaces of juxtaposed optical fibers under heat and pressure, followed by forming thereof into suitable shape. Therefore, there will be no gaps formed by virtue of fusing and there will be no such dead space as formed in the case of conventional optical fiber strands. The cross section of the used fibers is ordinarily polygonal as shown in the drawing.

FIG. 3 is a sectional view showing an example of the photoelectric transducer according to the present invention. In FIG. 3, 4 is an envelope of a cathode-ray tube, 5 is an optical fiber plate constituting a faceplate, 6 is a phosphor layer provided on the inner surface of the faceplate, and 7 is an electron beam from an electron gun. Further, 8 is a fused optical fiber plate, 9 is a manuscript in rolled shape, 10 is a transparent plate which is shaped into a prism 11, or a lens 12 and 13 are light shading blocks, 14 is a transparent adhesive (cement) cementing together the faceplate 5 and the above portion 8. 15 is an optical fiber bundle for collecting light reflected from the prism portion 11 of the transparent plate 10, and the output end of the bundle 15 faces to a receiving photo tube 16. In FIG. 3, the bright spot of the phosphor layer, which emits light responsive to scanning in the lateral direction (the direction perpendicular to the drawing) by an electron beam, passes through the faceplate 5 and the optical fiber plate 8, and scans the surface of the manuscript 9 which is moving in a vertical direction. The light reflected from the manuscript is received at the transparent plate 10 and is reflected by the prism portion 11 at the end of plate 10, and then, after passing through the optical fiber bundle 15, falls into the photoelectric tube 16, thus generating video signals corresponding to the manuscript as the output of the light thus transmitted from the manuscript.

Figure 1A:
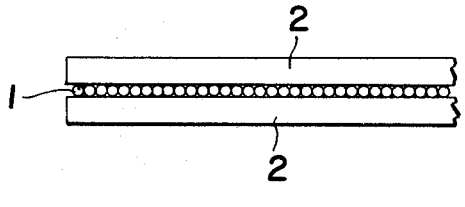
FIG. 1a is an end elevation view of an optical fiber plate used as a light transmitting element in the prior art.
Figure 1B:
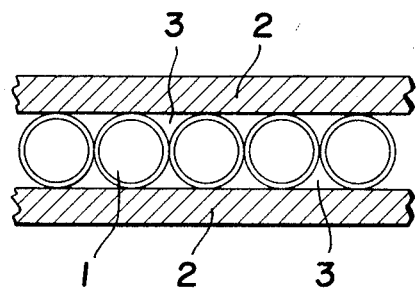
Figure 2A:
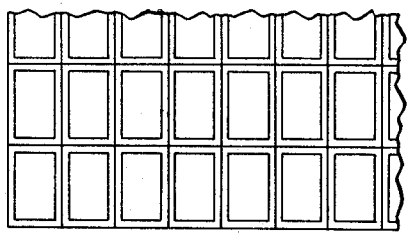
FIGS. 2a and 2b are end elevation views of optical fiber plates formed in accordance with the present invention.
Figure 2B:
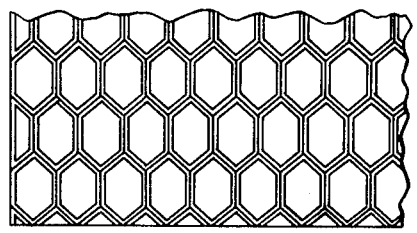

When this transducer is used for printout, the electron beam 7 may be modulated by video signals, etc. and the manuscript 9 may be replaced with photosensitive material such as for example, Electrofax. Thus printing can be made thereon.

FIG. 4 is a section of a transducer, showing another example of the present invention, wherein element 8 is fritted directly to the faceplate 16 of the cathode-ray tube, and a light receiving element is provided directly at the prism portion of the transparent plate 10 for receiving light of the photoelectric transducer. In FIG. 4, 17 is the element for receiving light, which may be a silicon diode, phototransistor, etc. This element is arranged adjacent to the prism 11. In this example, frit, etc. is used as cementing material. The output end 18 of the optical fiber plate 8 may be polished with a slight slant, as shown in FIG. 4 for reducing the effect of the specular reflective component when printed matter with a bright surface is used as manuscript paper. It is advantageous to place, for example, a transparent film of a thickness up to 100μ between the photoelectric conversion element and the manuscript for preventing contamination of the transducer and further for increasing the amount of reflected light. When the thickness of the film is larger than the above, it tends to deteriorate the signal/noise ratio. Thus the above-mentioned thickness limit is preferred.

It is also possible to make the light collecting or transmitting optical fiber bundle in three separate layers, and to provide, at the ends of the three separate layers facing the photoelectric element, respectively different filters. Thus, one of the filters can be a filter transmitting only red light, another filter may transmit only green light and a third filter may transmit only blue light. Thereby, electric signals corresponding to the respective colors can be read out of a colored manuscript. While in the examples shown in FIG. 3 and FIG. 4, transparent material with a high refractive index is used at the light receiving part 10, and the light reflected from the manuscript is led to the light receiving element by the internal reflection of the transparent material and the prism, this light receiving part 10 may also be made as a fused optical fiber plate.

FIGS. 5a, 5b and 5c further examples of the present invention, wherein an optical fiber glass plate is used also at the light receiving part. The fused optical fiber plate 8 can be made so that the light emitting face and light receiving face are integral with each other. In the example shown in FIG. 5a, suitable notches are provided in the optical fiber plate 8 and a prism 19, or in some case a lens or a cylindrical lens is preferable, is placed in the notch at the manuscript side, while the notch at the other side is filled with light shading paint 20. Thus it constitutes a relatively simple structure which can be made with a less number of manufacturing steps. In the example shown in FIG. 5b, the optical fiber plate 8 has a stepped form, and a light receiving element 21 and a light shading block 22 are provided, as shown in this figure, in the indented portion which constitutes the light receiving side.

Furthermore the fused optical fiber plates for light emitting and for light receiving can be made as separate structures by cementing together optical fiber plates which are separately formed, instead of composing the same as an integral structure. In this case, as in the example shown in FIG. 5c, the optical fiber plates 8, 8' do not necessarily have to be cut perpendicular to the fibers, even when the cut surface is slanted, as long as the light emitting side and the light receiving side are closely fitted to each other, similar effects may be obtained.

According to the present invention, since an optical fiber plate of the fused type having no dead space is used in transmission and light receiving for the bright spot, the readout of manuscripts having halftones is possible and the element can also be used for printing out. Thus a photoelectric and electric-light transducer with a improved efficiency can be obtained with simple structure. Moreover, in manufacturing, the adjustment of the scanning position of bright spot can be made remarkably easier.

What I claim is:

1. For use in photoelectric transducing apparatus of the type having an electron beam scanning a surface coated with electron activated light emitting material to convert graphic information into electrical output signals: light transmitting means, for transmitting light from said surface to copy carrying graphic information, comprising, in combination, a plurality of optical fibers fused together in juxtaposed relation to form a bundle having a solid, voidless cross section of said optical fibers; a transparent plate laterally closely adjacent to said fused fiber bundle to receive light reflected from the copy; a single photoelectric cell; and a bundle of nonfused optical fibers extending between said transparent plate and said single photoelectric cell for transmitting to said single photoelectric cell light reflected from said transparent plate.

2. Light transmitting means, as claimed in claim 1, in which said first mentioned bundle has an output surface which is a plane polished surface extending at an acute angle to the length of said optical fibers.

3. For use in photoelectric transducing apparatus, light transmitting means, as claimed in claim 1, including a relatively elongated light receiving channel aligned with the output face of said plate.

4. Light transmitting means, as claimed in claim 3, in which said light receiving channel contains a prism.

5. Light transmitting means, as claimed in claim 3, in which said light transmitting channel contains a lens.

6. Light transmitting means, as claimed in claim 3, in which said transducing apparatus includes a cathode-ray tube having said electron beam and a faceplate; said fused optical fiber plate being fritted directly to said faceplate.

7. Light transmitting means according to claim 3 in which the light receiving channel is a fused optical fiber plate.

8. Light transmitting means according to claim 3 which further comprises a light shield along the light receiving channel.

9. Light transmitting means according to claim 3 which further comprises a light collecting means to receive reflective light from the light receiving channel.

10. Light transmitting means, as claimed in claim 3, in which said second mentioned bundle is divided into plural separate subbundles each having a respective output end face; said and respective differently colored filters each interposed between a respective output end face of a subbundle and said photoelectric cell; whereby colored graphic information may be converted into respective electrical output signals.